United States Patent
Watson et al.

(10) Patent No.: US 11,814,569 B2
(45) Date of Patent: Nov. 14, 2023

(54) DRILLING FLUID LUBRICANTS

(71) Applicant: CHEVRON PHILLIPS CHEMICAL COMPANY LP, The Woodlands, TX (US)

(72) Inventors: Elan Watson, Montgomery, TX (US); Christopher B. Jackson, The Woodlands, TX (US); Marshall D. Bishop, Conroe, TX (US)

(73) Assignee: Chevron Phillips Chemical Company LP, The Woodlands, TX (US)

(*) Notice: Subject to any disclaimer, the term of this patent is extended or adjusted under 35 U.S.C. 154(b) by 0 days.

(21) Appl. No.: 17/655,518

(22) Filed: Mar. 18, 2022

(65) Prior Publication Data

US 2022/0298403 A1   Sep. 22, 2022

Related U.S. Application Data (60) Provisional application No. 63/163,733, filed on Mar. 19, 2021.

(51) Int. Cl.
| | |
|---|---|
| C09K 8/035 | (2006.01) |
| C09K 8/08 | (2006.01) |
| C09K 8/24 | (2006.01) |
| C09K 8/34 | (2006.01) |
| E21B 21/00 | (2006.01) |

(52) U.S. Cl.
CPC ............ *C09K 8/035* (2013.01); *C09K 8/08* (2013.01); *C09K 8/24* (2013.01); *C09K 8/34* (2013.01); *E21B 21/00* (2013.01); *C09K 2208/34* (2013.01)

(58) Field of Classification Search
None
See application file for complete search history.

(56) References Cited

U.S. PATENT DOCUMENTS

| | | | |
|---|---|---|---|
| 4,366,864 A * | 1/1983 | Gibson | E21B 43/247 166/266 |
| 4,401,162 A * | 8/1983 | Osborne | E21B 43/2401 166/280.1 |
| 4,429,744 A * | 2/1984 | Cook | E21B 43/243 166/402 |
| 7,906,010 B2 | 3/2011 | Keusenkothen et al. | |
| 8,709,233 B2 * | 4/2014 | McCoy | C10G 67/049 208/68 |
| 2012/0048545 A1 * | 3/2012 | Kaminsky | E21B 43/2401 166/272.1 |
| 2015/0136402 A1 * | 5/2015 | Hurd | C09K 8/502 166/305.1 |
| 2020/0208047 A1 * | 7/2020 | Gordon | C10C 3/02 |

* cited by examiner

*Primary Examiner* — John J Figueroa
(74) *Attorney, Agent, or Firm* — Eversheds Sutherland (US) LLP (57) ABSTRACT

A drilling fluid may include a carrier and a lubricant composition. The lubricant composition includes ethylene bottoms heavy pyrolysis oil. For example, the heavy pyrolysis oil may be bottoms of a fractionated fuel oil product separated from ethylene gas produced by a cracking of a hydrocarbon feedstock in a furnace.

20 Claims, 2 Drawing Sheets

DRILLING FLUID LUBRICANTS

CROSS-REFERENCE TO RELATED APPLICATIONS

This application claims the benefit of U.S. Provisional Application No. 63/163,733 filed on Mar. 19, 2021, which is incorporated herein in its entirety by reference.

TECHNICAL FIELD

This disclosure relates to drilling fluid lubricants, and more specifically, lubricants for drilling fluids used for drilling natural resource wells.

BACKGROUND

Wells can be drilled to extract natural resources such as oil, gas, or water. A wellbore is surrounded by a formation, for example, shale or clay, which can influence the stability of the wellbore. For example, the formation can exert pressure on the wellbore, or fluids from the formation can enter the wellbore. A formation can include permeable regions, and fluids introduced into the wellbore can enter the permeable regions, resulting in fluid loss. Such fluid loss can affect drilling efficiency, can entail replacement of drilling fluids, and can affect the stability of the formation.

Drilling compositions, for example, drilling fluids or drilling muds, can be used to facilitate the drilling of wellbores. Drilling fluid or mud can be distributed and circulated along a wellbore to provide functions such as cooling and lubrication of drilling equipment, or to remove cuttings and clear the borehole. In addition to performing these functions, drilling compositions can also assist in promoting formation stability.

The rheology of drilling fluids affects their performance. For example, maintaining the viscosity of a drilling fluid below an upper threshold can provide better drilling fluid performance. Additives, for example, lubricants, can be used to control the flow and rheology of drilling fluids. However, there remains a need for improvements in lubricants, for example, in reducing costs while maintaining performance over existing lubricants.

SUMMARY OF THE DISCLOSURE

This summary is provided to introduce various concepts in a simplified form that are further described below in the detailed description. This summary is not intended to identify required or essential features of the claimed subject matter nor is the summary intended to limit the scope of the claimed subject matter.

In aspects, the present disclosure describes a drilling fluid including a carrier and a lubricant composition. The lubricant composition includes ethylene bottoms heavy pyrolysis oil. For example, the heavy pyrolysis oil may be bottoms of a fractionated fuel oil product separated from ethylene gas produced by a cracking of a hydrocarbon feedstock in a furnace.

In aspects, the present disclosure describes a lubricant composition for a drilling fluid. The lubricant composition may include an ethylene bottoms heavy pyrolysis oil, and one or both of an asphalt sulfonate salt or a surfactant.

Lubricant compositions according to the disclosure may be more economical than lubricants prepared by conventional processes, while providing similar or better lubricating properties.

This summary and the following detailed description provide examples and are explanatory only of the disclosure. Accordingly, the foregoing summary and the following detailed description should not be considered to be restrictive. Additional features or variations thereof can be provided in addition to those set forth herein, such as for example, various feature combinations and sub-combinations of these described in the detailed description.

BRIEF DESCRIPTION OF THE DRAWINGS

The following figures form a part of the present disclosure and are included to further demonstrate certain aspects of the present invention. The invention may be better understood by reference to one or more of these figures in combination with the detailed description of the specific embodiments presented herein.

While the inventions disclosed herein are susceptible to various modifications and alternative forms, only a few specific aspects have been shown by way of example in the drawings and are described in detail below. The figures and detailed descriptions of these specific aspects are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION

It is to be understood that the disclosure is not limited in its application to the details of construction and the arrangement of components set forth in the following description or illustrated in the drawings.

Definitions

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, 2nd Ed (1997) can be applied, as long as that definition does not conflict with any other disclosure or definition applied herein or render indefinite or non-enabled any claim to which that definition is applied. To the extent that any definition or usage provided by any document incorporated herein by reference conflicts with the definition or usage provided herein, the definition or usage provided herein controls.

While compositions and methods are described in terms of "comprising" various components or steps, the compositions and methods can also "consist essentially of" or "consist of" the various components or steps, unless stated otherwise.

The terms "a," "an," and "the" are intended to include plural alternatives, e.g., at least one. The terms "including", "with", and "having", as used herein, are defined as comprising (i.e., open language), unless specified otherwise.

The term "pyrolysis oil" and its abbreviated form "py-oil" are used herein and have its well-known meaning, namely, the heavy oil fraction ($C_{10}+$) resultant from steam cracking ethane.

The term "light pyrolysis oil" and its acronym "LPO," as used herein in certain embodiments, refers to pyrolysis oil having a final boiling point of about 440° C., 450° C., 460° C., or 470° C.

The term "heavy pyrolysis oil" and its acronym "HPO," as used herein in certain embodiments, refers to pyrolysis oil having an initial boiling point of about 440° C., 450° C., 460° C., or 470° C.

The term "saponification" refers to a phenomenon, also known as "cheesing out" or "greasing," where lubricants exhibit agglomeration, transforming the lubricant from being a miscible liquid in a drilling fluid, into curdles, small clots, or gels.

The term "similar drilling fluid" in this specification refers to a comparison being made to an equivalent composition in all other aspects but for the substitution of the specified component or omission thereof.

Various numerical ranges are disclosed herein. When Applicant discloses or claims a range of any type, Applicant's intent is to disclose or claim individually each possible number that such a range could reasonably encompass, including end points of the range as well as any sub-ranges and combinations of sub-ranges encompassed therein, unless otherwise specified. For example, all numerical end points of ranges disclosed herein are approximate, unless excluded by proviso. As a representative example, if Applicants disclose in an aspect of the disclosure that a lubricant composition includes from about 1% by weight to about 10% by weight of a compound, this range should be interpreted as encompassing about 1% and about 10% by weight of the compound.

Values or ranges may be expressed herein as "about", from "about" one particular value, and/or to "about" another particular value. When such values or ranges are expressed, other embodiments disclosed include the specific value recited, from the one particular value, and/or to the other particular value. Similarly, when values are expressed as approximations, by use of the antecedent "about," it will be understood that the particular value forms another embodiment. It will be further understood that there are a number of values disclosed therein, and that each value is also herein disclosed as "about" that particular value in addition to the value itself. In another aspect, use of the term "about" means ±20% of the stated value, ±15% of the stated value, ±10% of the stated value, ±5% of the stated value, ±3% of the stated value, or ±1% of the stated value.

Applicant reserves the right to proviso out or exclude any individual members of any such group of values or ranges, including any sub-ranges or combinations of sub-ranges within the group, that can be claimed according to a range or in any similar manner, if for any reason Applicant chooses to claim less than the full measure of the disclosure, for example, to account for a reference that Applicant may be unaware of at the time of the filing of the application. Further, Applicant reserves the right to proviso out or exclude any individual substituents, analogs, compounds, ligands, structures, or groups thereof, or any members of a claimed group, if for any reason Applicant chooses to claim less than the full measure of the disclosure, for example, to account for a reference that Applicant may be unaware of at the time of the filing of the application.

Although any methods and materials similar or equivalent to those described herein can be used in the practice or testing of the invention, the typical methods and materials are herein described.

All publications and patents mentioned herein are incorporated herein by reference for the purpose of describing and disclosing, for example, the constructs and methodologies that are described in the publications, which might be used in connection with the presently described invention. The publications discussed throughout the text are provided solely for their disclosure prior to the filing date of the present application. Nothing herein is to be construed as an admission that the inventors are not entitled to antedate such disclosure by virtue of prior invention.

The present disclosure generally relates to drilling fluid lubricants, and more specifically, lubricants for drilling fluids used for drilling natural resource wells. Friction (often referenced as an increase in torque and drag) between the drill string, including the bottom hole assembly, and the formations penetrated during drilling reduces the rate of penetration, increases horsepower requirements of the drill rig, and can be a limiting factor in total measured depth. Excess friction or an unexpected increase in friction can result in serious problems such as stuck tools or even twist offs.

Lubricants are widely used to facilitate drilling. However, the commercially available products are either costly and/or not effective in some drilling fluids. Many lubricants that are not effective in drilling fluids are based on field brines, which do not significantly reduce the coefficient of friction (COF) or are incompatible with the fluid. One example is lubricants that "cheese out," i.e. form thick emulsified globules that plug solids control equipment.

The cost of lubricant can impact the economic feasibility of a drilling project. Lubricant compositions according to the present disclosure may be more economical than conventional lubricants, while providing similar or better lubricating properties. Thus, lubricant compositions according to the present disclosure may improve the economic feasibility of drilling projects.

Further, use of the compositions according to the disclosure may reduce the amount of waste streams generated by ethylene production. For example, in conventional ethylene production by cracking, a hydrocarbon feedstock is cracked in a furnace to generate a stream including ethylene and other products. The stream includes heavy oil components, also known as heavy pyrolysis oil, to be separated from ethylene.

The inventors of the present disclosure surprisingly found that the heavy pyrolysis oil is suitable for use as a lubricant in drilling operations, and in particular, as a lubricant composition for drilling fluids. For example, incorporating a small percentage of heavy pyrolysis oil in the drilling fluid significantly reduces the coefficient of friction of drilling fluids based on (but not limited to) the production brines available in the Permian Basin. Lubrication properties can be determined in terms of coefficients of friction, and coefficients of friction of lubricant compositions according to the disclosure were comparable or lower than conventional lubricants.

The inventors also surprisingly found that certain additives may be added to heavy pyrolysis oil, for example, one or both of surfactant or asphalt sulfonate salt, also providing useful lubricant compositions. For example, Aqua-Cleen® and Aqua-Cleen® HC, available from Chemical Products Industries Inc., Oklahoma City, Oklahoma, are surfactants which can be added to the heavy pyrolysis oil, and which is then added to drilling fluids based on very hard brines such as used in the Bakken. Such a lubricant provides exceptional reductions in the COF without detrimental effects on the mud. It was surprisingly found that the addition of surfactants, increased lubricity in difficult drilling fluids such as saturated brines.

Aqua-Cleen® is an ethoxylated sulfur-based, non-ionic surfactant (a non-ionic, sulfur-based polyoxyethylene surfactant, sometimes described as an ethoxylated mercaptan surfactant or a sulfur-containing polyether surfactant) for use in aqueous formulations. A surfactant preferable for use may be compatible with both sodium and calcium brines. A surfactant suitable for use in compositions according to the present disclosure may have a hydrophobic-lipophilic balance (HLB) [the balance of the size and strength of the hydrophilic and lipophilic moieties of a surfactant molecule] between 8 and 20, preferably between 9 and 18 and more preferably between 12 and 16. In aspects, the surfactant has an HLB of 13.5.

The surfactant may have a cloud point in the range of from 50° C. to 85° C. U.S. Pat. No. 10,787,599, which describes a sulfur-containing polyether surfactant, is incorporated herein in its entirety by reference. The sulfur-containing polyether surfactant (or mixture of surfactants) can be characterized by a cloud point (1 wt. % aqueous solution) that generally falls within a range from about 55° C. to about 85° C., more particularly from about 60° C. to about 80° C., but is not limited solely to these ranges. In aspects, the sulfur-containing polyether surfactant (or mixture) can be characterized by a cloud point (1 wt. % aqueous solution) that falls within a range from about 63° C. to about 80° C.

The cloud point of surfactants, in accordance with the present disclosure, can be determined by ASTM D2024-09 (2017), entitled "Standard Test Method for Cloud Point of Nonionic Surfactants." According to this test method, particularly useful for non-ionic surfactants, a one percent test solution is prepared by weighing one gram of the surfactant into a 150 mL beaker, to which 100 mL of distilled, demineralized water at a temperature of less than 30° C. (86° F.) are added. The sample is agitated until solution is reached, after which a 50 mL aliquot of the solution is placed into a test tube. While agitating the sample solution slowly with a thermometer, the test tube is heated with a Bunsen burner until the sample solution becomes definitely cloudy, at which point it is removed from the heat. While stirring with the thermometer continues, the test tube and its sample solution are allowed to cool slowly until the sample solution clarifies, at which point the temperature is noted. Such a test method provides a simple, yet reliable, means for determining the cloud point of a sulfide surfactant in water.

The heavy pyrolysis oil was not previously known to have lubricating qualities, nor was it previously known to have performance properties for use as a drilling fluid lubricant. As such, the chemistry of the heavy pyrolysis oil is different from other petroleum based lubricants such as PAO or traditional mineral based oil. It is also distinguished from the extreme pressure lubricant additives such as chlorinated paraffins, esters, polysulfides, sulfurized fatty acids, and the like. Further, heavy pyrolysis oil is completely different from lubricating plastic beads, mineral lubricants such as graphite and molybdenum disulfide, and the like. Thus, the utility of heavy pyrolysis oil as a lubricant and its performance were unexpected.

In aspects, the present disclosure describes a drilling fluid including a carrier and a lubricant composition. The lubricant composition includes ethylene bottoms heavy pyrolysis oil. For example, the heavy pyrolysis oil may be bottoms of a fractionated fuel oil product separated from ethylene gas produced by a cracking of a hydrocarbon feedstock in a furnace.

In aspects, the present disclosure describes a lubricant composition for a drilling fluid. The lubricant composition may include an ethylene bottoms heavy pyrolysis oil, and one or both of an asphalt sulfonate salt or a surfactant.

Compositions according to the present disclosure, for example, drilling fluid compositions, may include a lubricant designed to reduce the coefficient of friction due to the presence of fine solids and salts in drilling fluids, particularly in oil-based drilling fluids, and particularly under basic (pH greater than 7.5 up to pH 11.5) conditions. In some aspects, a wellbore fluid composition according to the present disclosure reduces the coefficient of friction by at least 50% relative to the same wellbore fluid composition absent the lubricant. The composition/additive may thus be used to reduce the coefficient of friction or to increase the lubricity of a wellbore fluid, such as a brine-based wellbore fluid. A lubricant according to the present disclosure may be especially effective in drilling and drill-in fluids containing brine. The compositions of the present disclosure are generally stable to high temperatures, maintaining lubricity up to at least 150° F., or up to at least 170° F., or up to at least 200° F., or up to at least 225° F., and are stable at cold and surface temperatures, exhibiting no or reduced precipitation and/or color changes, and may provide a reduction in the coefficient of friction of up to at least 25%, 30%, 35%, 40%, 45%, 50%, 60% or 70% relative to untreated wellbore fluids (see Examples 1 to 6 herein below). The lubricant compositions of this disclosure may also provide a foam-suppressing effect, exhibiting a minimal amount or tendency to foam when added to a wellbore fluid, eg., a monovalent brine.

Figure 1:
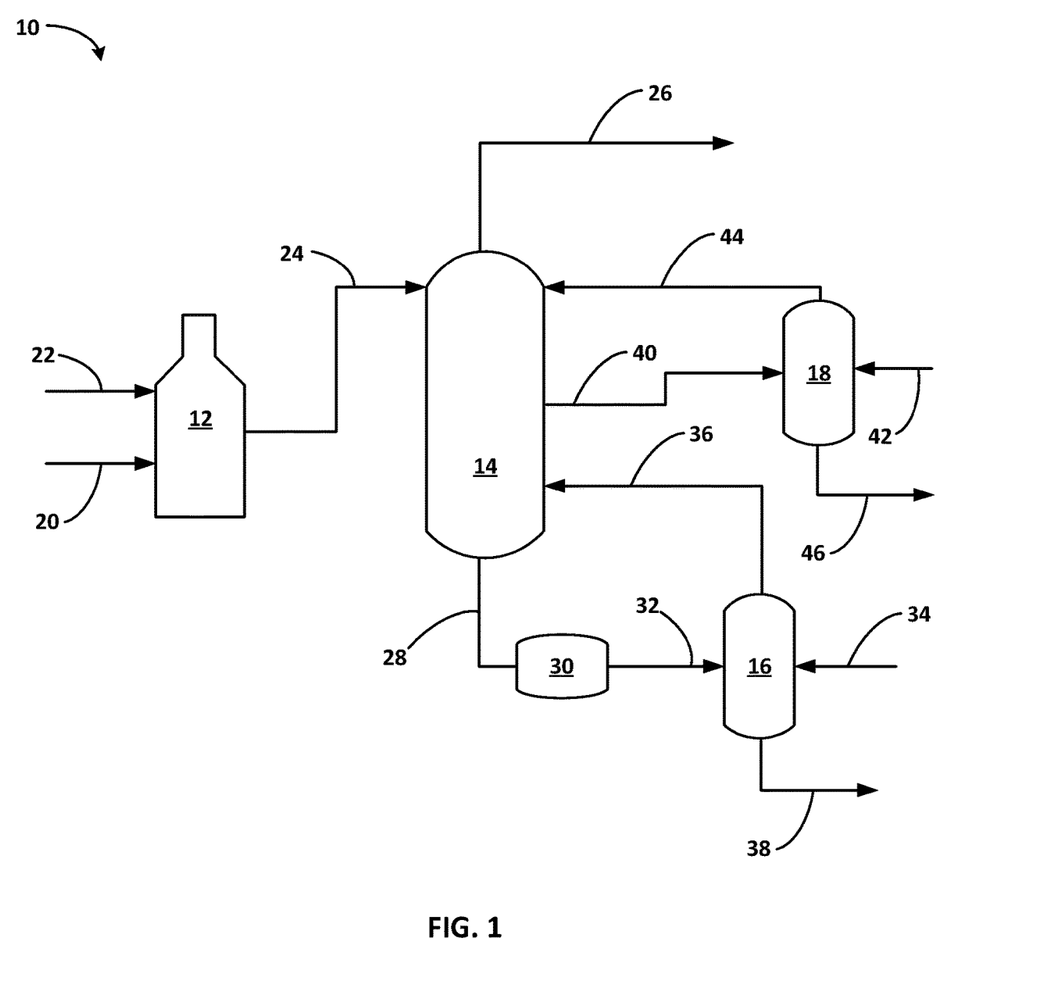
FIG. 1 is a conceptual block diagram of a system for producing a lubricant composition.

Turning now to the figures, FIG. 1 is a conceptual block diagram of a system 10 for producing a lubricant composition. System 10 includes a furnace 12, a gasoline fractionator 14, a heavy fuel oil stripper 16, and a light fuel oil stripper 18.

Furnace 12 may be steam cracking furnace. A feed stream 20 and a dilution steam stream 22 can be fed to furnace 12. Feed stream 20 includes a hydrocarbon feedstock. In aspects, the hydrocarbon feedstock includes one or more of ethane, propane, butane, Liquefied Petroleum Gas (LPG), Natural Gas Liquids (NGL), light ($C_2$-$C_5$) hydrocarbons, or naphtha ($C_6$-$C_{10}$). In some aspects, the hydrocarbon feedstock includes at least ethane, propane, and butane. In some aspects, the hydrocarbon feedstock consists essentially of ethane, propane, and butane.

The hydrocarbon feedstock is cracked (pyrolyzed) under high severity conditions (for example, high temperature and/or high pressure) to form an effluent stream 24 including one or more of ethylene, propylene, and byproducts.

Effluent stream 24 can be fed to gasoline fractionator 14 to separate the cracked gas as gas stream 26 from fuel oil products. Gas stream 26 is sent overhead from gasoline fractionator 14 to continue through a compression train.

Gasoline fractionator bottoms 28 can be filtered through a filter 30 (for example, a coke filter), and a filtrate stream 32 can be fed to heavy fuel oil stripper 16.

Filtered gasoline fractionator bottoms in filtrate stream 32 are fed to heavy fuel oil stripper 16 where steam can be injected in a first steam stream 34 to strip out light components to ensure a proper flash point of the product. The steam and light components are returned in a first recycle stream 36 to gasoline fractionator 14. A heavy pyrolysis oil product can be withdrawn through product stream 38 at the bottom of heavy fuel oil stripper 16. The heavy pyrolysis oil product can be sent to a storage tank for holding and eventual transport.

A light stream 40 from gasoline fractionator 14 can be fed to light fuel oil stripper 16 where steam can be injected in a second steam stream 34 to strip out light components that are returned with steam in a second recycle stream 44 to gasoline fractionator 14. A light fuel oil product can be withdrawn through light product stream 46 at the bottom of the light fuel oil stripper.

The heavy pyrolysis oil product of product stream 38 may be used in or as a lubricant composition. Thus, in aspects according to the disclosure, a lubricant composition may include ethylene bottoms heavy pyrolysis oil.

While the system and process described with reference to system 10 of FIG. 1 may be used to produce a heavy pyrolysis oil, any suitable technique may be used to prepare heavy pyrolysis oil according to the present disclosure.

In aspects, a drilling fluid according to the present disclosure includes a carrier, and a lubricant composition. The carrier may be any suitable carrier for a drilling fluid, such as a drilling base fluid, and may include water, brine, oil, or other fluids. The drilling fluid may include an invert emulsion, for example, an oil-in-water emulsion, or may include a direct emulsion, for example, a water-in-oil emulsion.

The lubricant composition includes ethylene bottoms heavy pyrolysis oil. In aspects, heavy pyrolysis oil includes bottoms from a hydrocarbon feedstock steam cracker furnace. For example, the heavy pyrolysis oil may be produced using the system and process described with reference to FIG. 1. In aspects, the heavy pyrolysis oil consists essentially of bottoms from a hydrocarbon feedstock steam cracker furnace.

In aspects, the hydrocarbon feedstock comprises one or more of ethane, propane, butane, Liquefied Petroleum Gas (LPG), Natural Gas Liquids (NGL), light ($C_2$-$C_5$) hydrocarbons, or naphtha ($C_6$-$C_{10}$). In some aspects, the hydrocarbon feedstock includes at least ethane, propane, and butane. In some aspects, the hydrocarbon feedstock consists essentially of ethane, propane, and butane.

A major fraction or component of the heavy pyrolysis oil may include petroleum hydrocarbons. For example, the heavy pyrolysis oil may include from about 75% to about 80% by weight of petroleum hydrocarbons. In aspects, the heavy pyrolysis oil includes petroleum hydrocarbons in a range from 75% to 80% by weight. In some aspects, the heavy pyrolysis oil includes about 78.1% by weight of petroleum hydrocarbons.

The petroleum hydrocarbons may include aliphatics or aromatics. In aspects, the petroleum hydrocarbons include certain hydrocarbons as major components of the heavy pyrolysis oil. For example, the heavy pyrolysis oil may include naphthalene in a range of from 10% to 30% by weight, biphenyl in a range of from 1% to 10% by weight, phenanthrene in a range of from 1% to 10% by weight, and anthracene in a range of from 1% to 10% by weight. In some aspects, the heavy pyrolysis oil can include naphthalene in a range of from 20% to 30% by weight, biphenyl in a range of from 1% to 10% by weight, phenanthrene in a range of from 1% to 10% by weight, and anthracene in a range of from 1% to 10% by weight.

Figure 2:
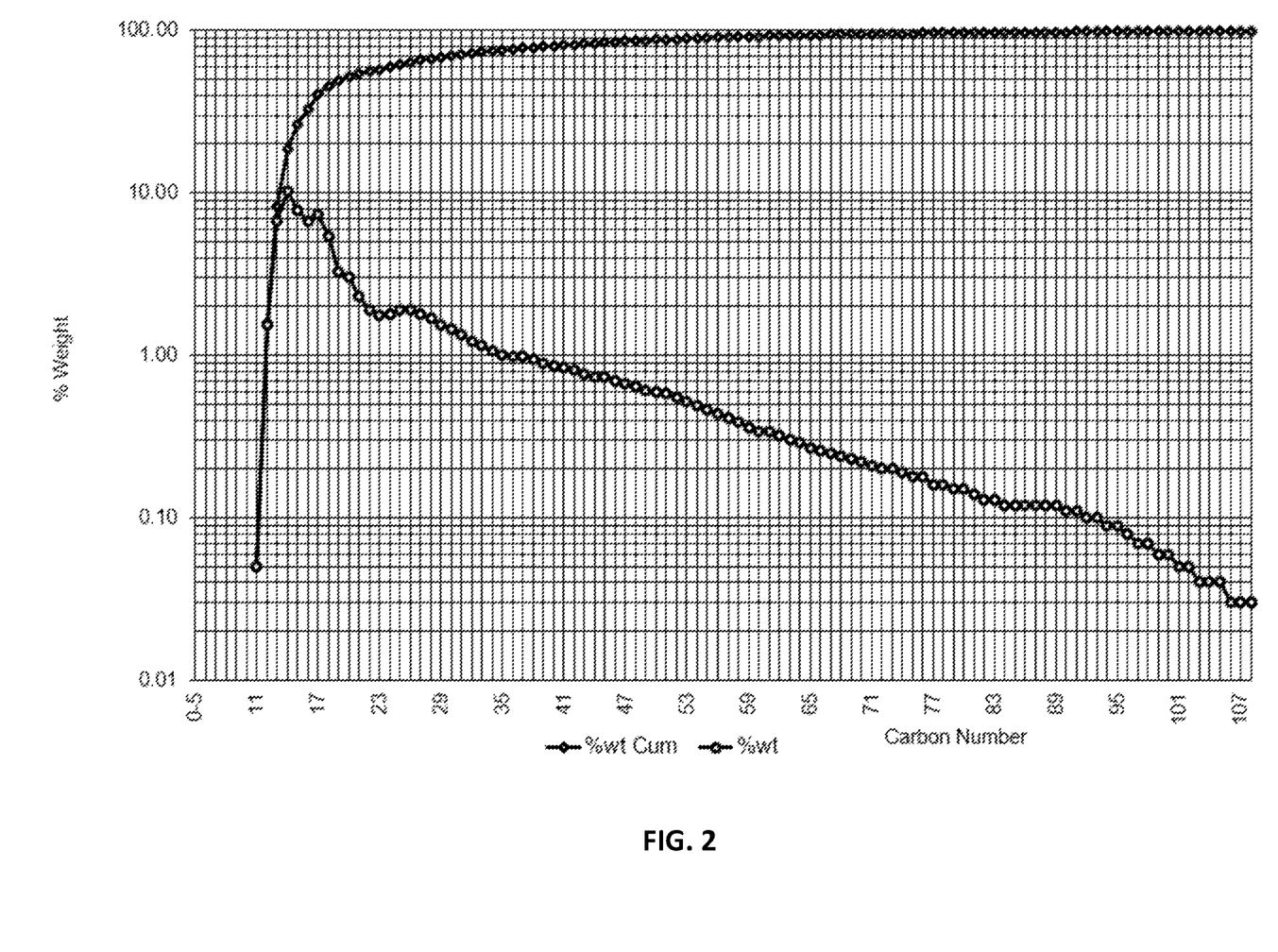
FIG. 2 is a chart showing carbon number distribution of a sample heavy pyrolysis oil.

The composition of the heavy pyrolysis oil may also be defined in terms of carbon-number of hydrocarbon components. For example, FIG. 2 is a chart showing carbon number distribution of a sample heavy pyrolysis oil. In some aspects, the heavy pyrolysis oil has a carbon number distribution the same as or similar to that shown in FIG. 2.

In some aspects, the heavy pyrolysis oil includes less than 1000 ppm of $C_1$ to $C_6$ organic compounds, less than 1000 ppm of $C_7$ to $C_8$ organic compounds, about 500 ppm of $C_9$ to $C_{10}$ organic compounds, from about 15,000 ppm to about 35,000 ppm of $C_{11}$ to $C_{12}$ organic compounds, from about 250,000 ppm to about 450,000 ppm of $C_{13}$ to $C_{16}$ organic compounds, from about 150,000 ppm to about 350,000 ppm of $C_{17}$ to $C_{21}$ organic compounds, from about 50,000 ppm to about 150,000 ppm of $C_{22}$ to $C_{35}$ organic compounds, and from about 20,000 ppm to about 70,000 ppm of $C_n$ organic compounds, wherein n>35.

In some aspects, the heavy pyrolysis oil includes less than 1000 ppm of $C_1$ to $C_6$ organic compounds, less than 1000 ppm of $C_7$ to $C_8$ organic compounds, about 500 ppm of $C_9$ to $C_{10}$ organic compounds, about 25,000 ppm of $C_{11}$ to $C_{12}$ organic compounds, about 361,000 ppm of $C_{13}$ to $C_{16}$ organic compounds, about 232,000 ppm of $C_{17}$ to $C_{21}$ organic compounds, about 111,000 ppm of $C_{22}$ to $C_{35}$ organic compounds, and about 50,000 ppm of $C_n$ organic compounds, where n>35.

In some aspects, the heavy pyrolysis oil includes less than 1000 ppm of $C_1$ to $C_6$ organic compounds, less than 1000 ppm of $C_7$ to $C_8$ organic compounds, 510 ppm of $C_9$ to $C_{10}$ organic compounds, 25,860 ppm of $C_{11}$ to $C_{12}$ organic compounds, 361,470 ppm of $C_{13}$ to $C_{16}$ organic compounds, 232,230 ppm of $C_{17}$ to $C_{21}$ organic compounds, 111,640 ppm of $C_{22}$ to $C_{35}$ organic compounds, 50,360 ppm of $C_n$ organic compounds, where n>35.

In some aspects, the heavy pyrolysis oil includes less than 1000 ppm of aliphatic $C_1$ to $C_6$ organic compounds, less than 1000 ppm of aromatic $C_1$ to $C_6$ organic compounds, less than 1000 ppm of aliphatic $C_7$ to $C_8$ organic compounds, less than 1000 ppm of aromatic $C_7$ to $C_8$ organic compounds, less than 1000 ppm of aliphatic $C_9$ to $C_{10}$ organic compounds, 510 ppm of aromatic $C_9$ to $C_{10}$ organic compounds, 280 ppm of aliphatic $C_{11}$ to $C_{12}$ organic compounds, 25,580 ppm of aromatic $C_{11}$ to $C_{12}$ organic compounds, 53,090 ppm of aliphatic $C_{13}$ to $C_{16}$ organic compounds, 308,380 ppm of aromatic $C_{13}$ to $C_{16}$ organic compounds, 24,920 ppm of aliphatic $C_{17}$ to $C_{21}$ organic compounds, 207,310 ppm of aromatic $C_{17}$ to $C_{21}$ organic compounds, 18,360 ppm of aliphatic $C_{22}$ to $C_{35}$ organic compounds, 92,280 ppm of aromatic $C_{22}$ to $C_{35}$ organic compounds, 5,570 ppm of aliphatic $C_n$ organic compounds, and 44,790 ppm of aromatic $C_n$ organic compounds, wherein n>35.

The heavy pyrolysis oil itself may be suitable as a lubricant composition, and the heavy pyrolysis oil may be added as a lubricant additive or composition to a drilling fluid. In other aspects, further components may be added to the heavy pyrolysis oil.

For example, wherein the lubricant composition may include the heavy pyrolysis oil, and further include a surfactant. In aspects, the surfactant can be a non-ionic surfactant. In some aspects, the non-ionic surfactant is present in a range of from 1% to 20% by weight of the lubricant composition. In some aspects, the non-ionic surfactant is present in a range of from 1% to 10% by weight of the lubricant composition. In some aspects, the surfactant includes an ethoxylated mercaptan. The ethoxylated mercaptan may be present in a range of from 1% to 20% by weight of the lubricant composition, or in a range of from 1% to 10% by weight of the lubricant composition, or in a range of from 7% to 12% by weight of the lubricant composition, or in a range of from 1% to 5% by weight of the lubricant composition. In some aspects, the ethoxylated mercaptan is present in an amount of 3% by weight of the lubricant composition.

The drilling fluid may include any suitable amount or concentration of lubricant compositions according to the disclosure. For example, the lubricant composition may be present in a range of more than 0.1% by weight of the drilling fluid. In aspects, the lubricant composition is present in a range of more than 1.0% by weight of the drilling fluid.

In aspects, the lubricant composition is present in a range of less than 5.0% by weight of the drilling fluid. In some aspects, the lubricant composition is present in a range of less than 3.0% by weight of the drilling fluid. In some aspects, the lubricant composition is present in an amount of 2.0% by weight of the drilling fluid.

In aspects, the carrier of the drilling fluid can be a water-based carrier, and the lubricant composition is present in a range of from 1.0% to 5.0% by weight of the drilling fluid.

In aspects, the carrier of the drilling fluid can be an oil-based carrier, and the lubricant composition is present in a range of from 1.0% to 5.0% by weight of the drilling fluid.

The lubricant composition may also include further additives. For example, the lubricant composition may include an asphalt sulfonate salt. In aspects, the asphalt sulfonate salt is sodium asphalt sulfonate. In aspects, the asphalt sulfonate salt is present in a concentration of 15% to 30% by weight of the lubricant composition.

The coefficient of friction of the lubricant composition may be determined, and may be an indicator of lubricity. For example, a lower coefficient of friction indicates higher lubricity. The coefficient of friction may be measured using a lubricity meter, for example, a pressurized fluid may be applied to two hardened steel surfaces (a rotating ring and a stationary block), and a torque exerted on a torque shaft lever arm may be measured. The torque reading may be divided by the load or the force with which the block is pressed against the ring through the torque arm. A suitable lubricity meter is Lubricity Meter 112-00 by OFI Testing Equipment, Inc. (Houston, Texas).

Lubricities (coefficients of friction) may alternatively be determined utilizing standard FANN® and Falex lubricity meters. FANN® lubricities may be determined using a FANN® Lubricity meter (Model 212), commercially available from FANN® Instrument Company. Falex lubricities may be determined utilizing a Falex Lubricant Tester (manufactured by and commercially available from Faville-Le Vally Corporation of Bellwood, Illinois). The Falex apparatus provides for the measurement of torque at increasing loads which are applied to a journal-V block assembly during prescribed time intervals.

The coefficient of friction varies with the pressure applied to the fluid.

In aspects, the coefficient of friction of the drilling fluid is in a range of from 0.01 to 0.20 at a pressure of 100 pounds per square inch. In some aspects, the coefficient of friction of the drilling fluid is in a range of from 0.10 to 0.60 at a pressure of 300 pounds per square inch. In some aspects, the coefficient of friction of the drilling fluid is in a range of from 0.10 to 0.60 at a pressure of 600 pounds per square inch.

Including the surfactant or sodium asphalt sulfonate may influence the coefficient of friction, for example, promoting lubricity under certain conditions.

In aspects, the lubricant composition includes the surfactant, and the coefficient of friction of the drilling fluid is in a range of from 0.10 to 0.10 at a pressure of 100 pounds per square inch. In aspects, the lubricant composition includes the surfactant, and wherein the coefficient of friction of the drilling fluid is in a range of from 0.40 to 0.60 at a pressure of 300 pounds per square inch. In aspects, the lubricant composition includes the surfactant, and wherein the coefficient of friction of the drilling fluid is in a range of from 0.40 to 0.60 at a pressure of 600 pounds per square inch.

In aspects, the lubricant composition includes the asphalt sulfonate salt, and the coefficient of friction of the drilling fluid is in a range of 0.01 to 0.10 at a pressure of 100 pounds per square inch. In aspects, the lubricant composition includes the asphalt sulfonate salt, and the coefficient of friction of the drilling fluid is in a range of 0.10 to 0.50 at a pressure of 300 pounds per square inch. In aspects, the lubricant composition includes the asphalt sulfonate salt, and the coefficient of friction of the drilling fluid is in a range of 0.10 to 0.50 at a pressure of 600 pounds per square inch.

Dispersibility is commonly defined as the ease with which a lubricant can be dispersed within a fluid medium. A lubricant with good dispersibility will take less time and agitation to homogenize throughout the fluid medium. Good dispersibility in a water or a brine-based system decreases the chances that the lubricant particles will aggregate together and cease to be homogenized in the system. When this happens, the lubricant essentially loses effectiveness by coming out of solution and will also likely float on top of the medium. This is referred to in the industry as saponification, or "cheesing out." Most lubricants will do this given enough time, especially in the absence of agitation.

Stability is an indication of how long a lubricant stays dispersed in a fluid medium. A lubricant with good stability will not separate quickly from the medium after being dispersed. Better stability means a relatively longer time before the lubricant "cheeses out."

Saponification or cheesing out may be frequently experienced in the field when using lubricants, especially in hostile environments such as in high divalent cations environments and/or at elevated temperatures. Saponification or cheesing out tends to negatively impact the performance of the affected lubricant, either partially or fully.

In aspects, drilling fluids including lubricant compositions according to the disclosure do not exhibit saponification. For example, a drilling fluid including a lubricant composition may not exhibit saponification in a Bakken brine or in a calcium chloride-based brine. In aspects, saponification may be absent when the drilling fluid is at a pH of 11.0 or lower.

While drilling fluids including lubricant compositions have been described, the disclosure also describes lubricant compositions. In aspects, the lubricant composition includes an ethylene bottoms heavy pyrolysis oil. In aspects, the lubricant composition consists of or consists essentially of an ethylene bottoms heavy pyrolysis oil.

In some aspects, the lubricant composition may include one or more additives. For example, a lubricant composition may further include one or both of a conventional lubricant or an extreme pressure additive, in addition to heavy pyrolysis oil.

In aspects, the lubricant composition includes an ethylene bottoms heavy pyrolysis oil, and one or both of an asphalt sulfonate salt or a surfactant. In some aspects, the lubricant composition comprises the asphalt sulfonate salt. In some aspects, lubricant composition comprises the surfactant. In some such aspects, the lubricant composition comprises the asphalt sulfonate salt and the surfactant.

Other aspects of lubricant compositions may be similar to those described with reference to the lubricant compositions provided in drilling fluids according to the present disclosure.

The present disclosure also provides methods for preparing a lubricant composition. In aspects, a method for preparing a lubricant composition includes adding one or both of a surfactant or an asphalt sulfonate salt to a heavy pyrolysis oil.

The present disclosure also provides methods for preparing a drilling fluid. In aspects, a method for preparing a drilling fluid includes adding a lubricant composition according to the present disclosure to a drilling fluid carrier.

Thus, compositions and techniques according to the disclosure can be used to provide suitable lubrication to drilling muds while drilling wellbores.

EXAMPLES

The invention is further illustrated by the following examples, which are not to be construed in any way as imposing limitations to the scope of this invention. Various other aspects, embodiments, modifications, and equivalents thereof which, after reading the description herein, can suggest themselves to one of ordinary skill in the art without departing from the spirit of the present invention or the scope of the appended claims.

Sample drilling fluids were prepared including different types and concentrations of lubricants and additives.

The sample drilling fluids of Examples 1 to 6 were evaluated to determine the coefficient of friction for each sample. A torque reading was determined at different pressures, ranging from 100 psi to 600 psi, using an OFITE 112-00 Lubricity Tester (OFI Testing Equipment Inc., Houston, Texas). The torque readings in the examples below can be divided by 100 to obtain the coefficient of friction. The samples were individually positioned between a hardened steel block and rotating ring in the Lubricity Tester. A force of 150 inch-pounds (in-lb) was applied between the hardened steel block and the rotating ring while the rotating ring spun at 60 rotations per minute (RPM).

In some examples, samples were hot rolled at 170° F. for 16 hours, in a 500 mL OFITE 175-65 Aging Cell (OFI Testing Equipment Inc., Houston, Texas) in an OFITE 173-00-C roller oven (OFI Testing Equipment Inc., Houston, Texas), and the torque readings were determined after hot-rolling, to simulate field conditions.

Rheological properties were also evaluated before and after hot-rolling. The viscosity was measured at 600 rpm, 300 rpm, 200 rpm, 100 rpm, 6 rpm, and 3 rpm (in terms of deflection dial readings) using a Model 35 Viscometer (Fann Instrument Company, Houston, Texas) or equivalent at the target temperature. $\theta_{rpm}$ is the angle of deflection observed at a specific rpm. The apparent viscosity (AV in cP) was calculated as per standard API practice, using Equation 1. The plastic viscosity (PV, in cP) was calculated as per standard API practice, using Equation 2. The yield point (YP, in lbs/100 ft$^2$) was calculated as per standard API practice, using Equation 3.

$$AV = \theta_{600}/2 \quad \text{(Equation 1)}$$

$$PV = \theta_{600} - \theta_{300} \quad \text{(Equation 2)}$$

$$YP = \theta_{300} - PV \quad \text{(Equation 3)}$$

Gel strength (GS) is described with units lbs/100 ft$^2$. "10 s GS" is the 10 second gel strength, and "10 m GS" is the 10 minute gel strength.

Example 1

A 9.2 lbs/gallon Permian field brine was used as a control, and the torque readings associated with different types and concentrations of lubricant were determined at different pressures, as shown in TABLE 1. "OVL." indicates overload. "HPO" is "Heavy Pyrolysis Oil," and "SAS" is "Sodium Asphalt Sulfonate."

TABLE 1

| | 100 psi | 150 psi | 200 psi | 250 psi | 300 psi | 350 psi | 400 psi | 450 psi | 500 psi | 550 psi | 600 psi |
|---|---|---|---|---|---|---|---|---|---|---|---|
| Control (Brine) | 16.1 | 25.9 | 36.8 | 57.6 | 64.1 | OVL. | | | | | |
| Commercial Lubricant (2%) | 3.5 | 3 | 2.7 | 4.1 | 5.2 | 7.1 | 8.5 | 11.3 | 16.2 | 22.2 | 29.1 |
| HPO (2%) | 1 | 1.1 | 1.7 | 2.2 | 2.8 | 4.2 | 6.6 | 9.9 | 12.7 | 16.5 | 18.5 |
| HPO (2% w/ 15% SAS) | 2.9 | 9.1 | 8.2 | 9.1 | 10.7 | 16.9 | 14.4 | 16.5 | 21.4 | 29.1 | 34.1 |
| HPO (2% w/ 30% SAS) | 5.2 | 9.5 | 10.5 | 12.2 | 14.5 | 15.5 | 17.6 | 22 | 27.8 | 28.4 | 34.8 |
| HPO (1%) | 1.5 | 1.7 | 1.8 | 2.7 | 3.6 | 5 | 5.9 | 7.9 | 9.7 | 12.6 | 14.4 |

The samples were hot-rolled at 170° F. (76.7° F.) for 16 hours, and the torque readings determined using the lubricity meter, as shown in TABLE 2.

TABLE 2

| | 100 psi | 150 psi | 200 psi | 250 psi | 300 psi | 350 psi | 400 psi | 450 psi | 500 psi | 550 psi | 600 psi |
|---|---|---|---|---|---|---|---|---|---|---|---|
| Control (Brine) | 18.4 | 28.1 | 33.1 | 42.4 | 50 | 57.7 | 71.1 | OVL. | | | |
| Commercial Lubricant (2%) | 2 | 6.2 | 10.1 | 16 | 21.5 | 26.6 | 30.5 | 34.3 | 37.2 | 40.5 | 41.4 |
| HPO (2%) | 8.5 | 7.2 | 10.4 | 17.6 | 27.2 | 34 | 46 | 70.4 | OVL. | | |
| HPO (2% w/ 15% SAS) | 3.4 | 4.4 | 5.2 | 16 | 24.9 | 31.3 | 32.6 | 48.8 | 59.8 | 68.8 | OVL. |
| HPO (2% w/ 30% SAS) | 3.6 | 5 | 6.1 | 7.2 | 14.9 | 18.6 | 22.8 | 26.8 | 10.1 | 10.5 | 13.3 |
| HPO (1%) | 2 | 5 | 9.1 | 9.6 | 13.2 | 20.7 | 28.5 | 35.2 | 66.3 | OVL. | |

Example 2

A 9.5 lbs/gallon water-based mud was used as a control, and the torque readings associated with different types and concentrations of lubricant were determined at different pressures, as shown in TABLE 3.

TABLE 3

|  | 100 psi | 150 psi | 200 psi | 250 psi | 300 psi | 350 psi | 400 psi | 450 psi | 500 psi | 550 psi | 600 psi |
| --- | --- | --- | --- | --- | --- | --- | --- | --- | --- | --- | --- |
| Control (Water Based Mud) | 20.9 | 31.4 | 40.6 | 55.1 | 71.7 | OVL. | | | | | |
| HPO (2%) | 17.9 | 25.3 | 30.8 | 33.6 | 37.4 | 41.5 | 45 | 48.6 | 48.2 | 58.6 | OVL. |
| HPO (2% w/ 15% SAS) | 9.8 | 11.3 | 10 | 15 | 8.9 | 9.1 | 11.4 | 12.9 | 17 | 18.4 | 18.9 |
| HPO (2% w/ 30% SAS) | 8 | 9 | 9.5 | 12.8 | 14.3 | 8.7 | 11.9 | 9.2 | 12 | 13.9 | 16.9 |
| HPO (4%) | 20.3 | 26.6 | 26.1 | 22 | 24.2 | 18 | 28.2* | 24.3* | 28.3* | 29.1* | 32.1* |

*stick slip was observed on lubricity meter

The rheological properties are shown in TABLE 4.

TABLE 4

|  | $\Theta_{600}$ | $\Theta_{300}$ | $\Theta_{200}$ | $\Theta_{100}$ | $\Theta_{60}$ | $\Theta_{30}$ | $\Theta_{6}$ | $\Theta_{3}$ | 10s. GS | 10m. GS | PV | YP |
| --- | --- | --- | --- | --- | --- | --- | --- | --- | --- | --- | --- | --- |
| Control (Water Based Mud) | 62.5 | 45 | 36.5 | 26.5 | 22 | 18 | 14 | 15.5 | 23 | 51 | 17.5 | 27.5 |
| HPO (2%) | 59.5 | 41.5 | 33 | 23.5 | 19 | 15 | 11 | 11 | 17 | 46 | 18 | 23.5 |
| HPO (2% w/ 15% SAS) | 53 | 39 | 33 | 26 | 22 | 18.5 | 16 | 16.5 | 27 | 54 | 14 | 25 |
| HPO (2% w/ 30% SAS) | 57 | 47 | 42 | 35.5 | 33 | 30.5 | 27.5 | 29 | 37 | 60 | 10 | 37 |
| HPO (4%) | 56 | 37.5 | 30 | 20 | 11 | 11.5 | 7.5 | 8 | 12 | 40 | 18.5 | 19 |

The samples were hot-rolled at 170° F. (76.7° C.) for 16 hours, and the torque readings determined using the lubricity meter, as shown in TABLE 5.

TABLE 5

|  | 100 psi | 150 psi | 200 psi | 250 psi | 300 psi | 350 psi | 400 psi | 450 psi | 500 psi | 550 psi | 600 psi |
| --- | --- | --- | --- | --- | --- | --- | --- | --- | --- | --- | --- |
| Control (Water Based Mud) | 19.4 | 29 | 43.6 | 53.2 | 61.7 | 70.6 | OVL. | | | | |
| HPO (2%) | 17.2 | 25.3 | 33.7 | 39.7 | 34 | 34.3 | 37 | 43.6 | 42.7 | 44.2 | 46.5 |
| HPO (2% w/ 15% SAS) | 12.1 | 1.3 | 2.4 | 2.9 | 3.9 | 5 | 5.8 | 7.4 | 8.4 | 11.5 | 19.8 |
| HPO (2% w/ 30% SAS) | 15 | 13.4 | 9 | 9.9 | 12 | 14.6 | 16.1 | 20* | 19.3* | 26* | 24.8* |
| HPO (4%) | 16.6 | 17.9 | 15.5 | 25.1 | 24.7 | 32.6 | 29.9 | 31.8 | 35.8 | 44.5 | 51.1 |

*stick slip was observed on lubricity meter

The rheological properties are shown in TABLE 6.

TABLE 6

|  | $\Theta_{600}$ | $\Theta_{300}$ | $\Theta_{200}$ | $\Theta_{100}$ | $\Theta_{60}$ | $\Theta_{30}$ | $\Theta_{6}$ | $\Theta_{3}$ | 10s. GS | 10m. GS | PV | YP |
| --- | --- | --- | --- | --- | --- | --- | --- | --- | --- | --- | --- | --- |
| Control (Water Based Mud) | 57 | 35 | 26.5 | 17 | 12 | 8.5 | 4 | 4 | 6 | 18 | 22 | 13 |
| HPO (2%) | 50 | 31.5 | 23 | 14 | 10 | 7 | 3 | 3 | 4 | 15 | 18.5 | 13 |
| HPO (2% w/ 15% SAS) | 54 | 34 | 25.5 | 15.5 | 12.5 | 9 | 5.5 | 5 | 9 | 23 | 20 | 14 |

TABLE 6-continued

|  | $\Theta_{600}$ | $\Theta_{300}$ | $\Theta_{200}$ | $\Theta_{100}$ | $\Theta_{60}$ | $\Theta_{30}$ | $\Theta_6$ | $\Theta_3$ | 10s. GS | 10m. GS | PV | YP |
|---|---|---|---|---|---|---|---|---|---|---|---|---|
| HPO (2% w/ 30% SAS) | 58 | 36 | 27 | 17.5 | 14 | 10.5 | 7 | 6.5 | 12 | 24 | 22 | 14 |
| HPO (4%) | 55 | 35 | 26.5 | 17 | 12 | 8.5 | 4 | 4 | 6 | 18 | 20 | 15 |

Example 3

An oil-based field mud was used as a control, and the torque readings associated with different types and concentrations of lubricant were determined at different pressures, as shown in TABLE 7.

TABLE 7

|  | 100 psi | 150 psi | 200 psi | 250 psi | 300 psi | 350 psi | 400 psi | 450 psi | 500 psi | 550 psi | 600 psi |
|---|---|---|---|---|---|---|---|---|---|---|---|
| Control (Oil Based Mud) | 5.3 | 7.4 | 8.8 | 13.6 | 14.4 | 21.5 | 24.5 | 32.4 | 35.5 | 40.9 | 45.4 |
| HPO (2%) | 5 | 7.4 | 9.3 | 8.7 | 9.3 | 11 | 11.2 | 13.2 | 15.8 | 18.3 | 22.7 |
| HPO (2% w/ 15% SAS) | 4.7 | 8 | 9.1 | 8.6 | 11.1 | 13.4 | 15.6 | 17.1 | 20.3 | 23.8 | 28 |
| HPO (2% w/ 30% SAS) | 7.9 | 9.5 | 10 | 14.9 | 16.7 | 19.4 | 21 | 22.3 | 25.3 | 28.5 | 36.4 |
| HPO (4%) | 6.3 | 7.6 | 6.9 | 9.5 | 12.9 | 23 | 21.4 | 21.6 | 26.5 | 31.7 | 40.3 |

The rheological properties are shown in TABLE 8.

TABLE 8

|  | $\Theta_{600}$ | $\Theta_{300}$ | $\Theta_{200}$ | $\Theta_{100}$ | $\Theta_{60}$ | $\Theta_{30}$ | $\Theta_6$ | $\Theta_3$ | 10s. GS | 10m. GS | PV | YP |
|---|---|---|---|---|---|---|---|---|---|---|---|---|
| Control (Oil Based Mud) | 218.5 | 122 | 87 | 50.5 | 35 | 23 | 11 | 9 | 13 | 24 | 96.5 | 25.5 |
| HPO (2%) | 187 | 105 | 76 | 45 | 32 | 21 | 10 | 9 | 12.5 | 24 | 82 | 23 |
| HPO (2% w/ 15% SAS) | 194 | 110 | 79 | 47 | 32.5 | 21.5 | 11 | 9 | 13 | 24 | 84 | 26 |
| HPO (2% w/ 30% SAS) | 196 | 110 | 79 | 47 | 33 | 21.5 | 11 | 9 | 13 | 24 | 86 | 24 |
| HPO (4%) | 201 | 115 | 82 | 48 | 34 | 22 | 11 | 9 | 13 | 23 | 86 | 29 |

The samples were hot-rolled at 170° F. (76.7° C.) for 16 hours, and the torque readings determined using the lubricity meter, as shown in TABLE 9.

TABLE 9

|  | 100 psi | 150 psi | 200 psi | 250 psi | 300 psi | 350 psi | 400 psi | 450 psi | 500 psi | 550 psi | 600 psi |
|---|---|---|---|---|---|---|---|---|---|---|---|
| Control (Oil Based Mud) | 7.3 | 8.6 | 10.9 | 12.4 | 13.8 | 15.8 | 21.9 | 32.8 | 39.7 | 47 | 46.9 |
| HPO (2%) | 6.4 | 8.4 | 9.6 | 13.7 | 14.9 | 18.7 | 22.6 | 27.9 | 36 | 38.2 | 43 |
| HPO (2% w/ 15% SAS) | 5.8 | 7.9 | 15.2 | 21.7 | 27.2 | 31.1 | 33.8 | 35.9 | 39.6 | 41 | 44.2 |
| HPO (2% w/ 30% SAS) | 5 | 8 | 13.6 | 20.2 | 21.7 | 25.9 | 28.7 | 32 | 36.3 | 39.1 | 42.4 |
| HPO (4%) | 4.8 | 8.9 | 14.6 | 20.3 | 21.9 | 24.8 | 27 | 30.3 | 37 | 40.2 | 42 |

The rheological properties are shown in TABLE 10.

TABLE 10

|  | $\Theta_{600}$ | $\Theta_{300}$ | $\Theta_{200}$ | $\Theta_{100}$ | $\Theta_{60}$ | $\Theta_{30}$ | $\Theta_6$ | $\Theta_3$ | 10s. GS | 10m. GS | PV | YP |
|---|---|---|---|---|---|---|---|---|---|---|---|---|
| Control (Oil Based Mud) | 241 | 135 | 95 | 54 | 36 | 22.5 | 10 | 8.5 | 13 | 23 | 106 | 29 |
| HPO (2%) | 235.5 | 131 | 92 | 52 | 35 | 22 | 10 | 8 | 12 | 22 | 104.5 | 26.5 |
| HPO (2% w/ 15% SAS) | 223 | 122.5 | 86.5 | 49 | 33.5 | 21 | 9 | 8 | 11 | 23 | 100.5 | 22 |

TABLE 10-continued

|  | $\ominus_{600}$ | $\ominus_{300}$ | $\ominus_{200}$ | $\ominus_{100}$ | $\ominus_{60}$ | $\ominus_{30}$ | $\ominus_{6}$ | $\ominus_{3}$ | 10s. GS | 10m. GS | PV | YP |
|---|---|---|---|---|---|---|---|---|---|---|---|---|
| HPO (2% w/ 30% SAS) | 231.5 | 126 | 88.5 | 50 | 34 | 21 | 9 | 8 | 11 | 21 | 105.5 | 20.5 |
| HPO (4%) | 240 | 130.5 | 91.5 | 51 | 35 | 22 | 9 | 8 | 11 | 20 | 109.5 | 21 |

Example 4

A Bakken brine mud was used as a control, and the torque readings associated with different types and concentrations of lubricant were determined at different pressures, as shown in TABLE 11 (before hot-rolling).

TABLE 11

|  | 100 psi | 150 psi | 200 psi | 250 psi | 300 psi | 350 psi | 400 psi | 450 psi | 500 psi | 550 psi | 600 psi |
|---|---|---|---|---|---|---|---|---|---|---|---|
| Control (Brine) | 12.5 | 18.6 | 25.8 | 32.4 | 39 | 46.1 | 53.5 | 61.3 | 70.5 | OVL. |  |
| Commercial Lubricant (3%) | 1.2 | 1.2 | 4.7 | 15.5 | 21.7 | 26.8 | 30.3 | 34.4 | 38.2 | 44.4 | 46.9 |
| HPO (3%) | 2.7 | 6.9 | 14.1 | 18 | 22.9 | 27.2 | 35.1 | 38.8 | 45.1 | 48.2 | 51.8 |
| HPO (3% w/ 3% Aqua-Cleen ®) | 5 | 5.7 | 8.7 | 14 | 18.9 | 23.1 | 26.5 | 30.8 | 34.6 | 38.4 | 43.6 |
| HPO (3% w/ 5% Aqua-Cleen ®) | 5.9 | 8.8 | 10.7 | 13.9 | 19.1 | 23.2 | 27 | 30.9 | 34.7 | 38.4 | 42.5 |

Example 5

Lubricant samples were tested for the tendency to induce saponification in Bakken brine. The testing included the following steps.
  a. Eight samples of Bakken Brine were measured out at 1 lab barrel each into mixer cups for a mixer (Hamilton Beach, Glen Allen, VA).
  b. A set of four samples (Samples 1-4) were set aside for testing with a surfactant-free HPO, and another four (Samples 5-8) for testing with HPO including surfactant.
  c. Samples 1-4 were each adjusted to test pH with a 50% caustic solution as follows: pH 10, 10.5, 11, and 11.5 respectively.
  d. Step (c) was repeated with Samples 5-8 respectively.
  e. Surfactant-free HPO was added to samples 1-4 at a concentration of 3% v/v.
  f. Step (d) was repeated by adding 3% v/v concentration of HPO including surfactant into Samples 5-8.
  g. Each sample was mixed for 10 minutes on the mixer.
  h. The samples were examined for signs of saponification.
  i. Next, the samples were hot rolled for 16 hours at 225° F.
  j. Hot-rolled samples were cooled in a cold-water bath to room temperature and afterwards examined for any signs of saponification.

Saponification was not observed, except at pH 11.5, where the samples saponified even before hot rolling. Without being bound by theory, the saponification at the higher pH of 11.5 may have been initiated by some interaction which may have caused the lubricant to agglomerate. Hot rolling those samples exacerbated the saponification. None of the compositions exhibited "cheesing out" or "greasing" upon standing.

Example 6

Lubricant samples were tested for tendency to induce saponification in calcium chloride brines. The testing included the following steps.
  a. Two cups each were prepared of calcium chloride brines at 10 lbs/gallon (ppg) and 11.6 ppg (saturated) respectively, according to water and calcium chloride quantities given in the calcium chloride brine table.
  b. Into cups 1 and 2 (10 ppg calcium chloride brine) 3% v/v of HPO was loaded, without and with surfactant, respectively.
  c. Into cups 3 and 4 (11.6 ppg calcium chloride brine), 3% v/v of HPO was loaded, without and with surfactant, respectively.
  d. Each sample was mixed for 10 minutes on the mixer.
  e. Afterwards, the samples were examined for any signs of saponification.

No saponification was observed, in both calcium chloride brines, indicating that the lubricants are suitable for use in calcium chloride brines up to saturation.

The invention is described above with reference to numerous aspects and embodiments, and specific examples. Many variations will suggest themselves to those skilled in the art in light of the above detailed description. All such obvious variations are within the full intended scope of the appended claims. Other aspects of the invention can include, but are not limited to, the following aspects. Many aspects are described as "comprising" certain components or steps, but alternatively, can "consist essentially of" or "consist of" those components or steps unless specifically stated otherwise.

ASPECTS OF THE DISCLOSURE

Aspect 1. A drilling fluid comprising:
  a carrier; and
  a lubricant composition,
    wherein the lubricant composition comprises ethylene bottoms heavy pyrolysis oil.
Aspect 2. The drilling fluid of aspect 1, wherein the heavy pyrolysis oil comprises bottoms from a hydrocarbon feedstock steam cracker furnace.

Aspect 3. The drilling fluid of aspect 1, wherein the heavy pyrolysis oil consists essentially of bottoms from a hydrocarbon feedstock steam cracker furnace.

Aspect 4. The drilling fluid of aspects 2 or 3, wherein the hydrocarbon feedstock comprises one or more of ethane, propane, butane, Liquefied Petroleum Gas (LPG), Natural Gas Liquids (NGL), light ($C_2$-$C_5$) hydrocarbons, or naphtha ($C_6$-$C_{10}$).

Aspect 5. The drilling fluid of any of aspects 1 to 4, wherein the heavy pyrolysis oil comprises from 75% to 80% by weight of petroleum hydrocarbons.

Aspect 6. The drilling fluid of aspect 5, wherein the heavy pyrolysis oil comprises about 78.1% by weight of petroleum hydrocarbons.

Aspect 7. The drilling fluid of any of aspects 1 to 6, wherein the heavy pyrolysis oil comprises:
naphthalene in a range of from 10% to 30% by weight,
biphenyl in a range of from 1% to 10% by weight,
phenanthrene in a range of from 1% to 10% by weight, and
anthracene in a range of from 1% to 10% by weight.

Aspect 8. The drilling fluid of any of aspects 1 to 7, wherein the heavy pyrolysis oil comprises:
less than 1000 ppm of $C_1$ to $C_6$ organic compounds,
less than 1000 ppm of $C_7$ to $C_8$ organic compounds,
about 500 ppm of $C_9$ to $C_{10}$ organic compounds,
from about 15,000 ppm to about 35,000 ppm of $C_{11}$ to $C_{12}$ organic compounds,
from about 250,000 ppm to about 450,000 ppm of $C_{13}$ to $C_{16}$ organic compounds,
from about 150,000 ppm to about 350,000 ppm of $C_{17}$ to $C_{21}$ organic compounds,
from about 50,000 ppm to about 150,000 ppm of $C_{22}$ to $C_{35}$ organic compounds, and
from about 20,000 ppm to about 70,000 ppm of $C_n$ organic compounds, wherein n>35.

Aspect 9. The drilling fluid of aspect 8, wherein the heavy pyrolysis oil comprises:
about 25,000 ppm of $C_{11}$ to $C_{12}$ organic compounds,
about 361,000 ppm of $C_{13}$ to $C_{16}$ organic compounds,
about 232,000 ppm of $C_{17}$ to $C_{21}$ organic compounds,
about 111,000 ppm of $C_{22}$ to $C_{35}$ organic compounds, and
about 50,000 ppm of $C_n$ organic compounds, wherein n>35.

Aspect 10. The drilling fluid of any of aspects 1 to 9, wherein the lubricant composition further comprises a surfactant.

Aspect 11. The drilling fluid of aspect 10, wherein the surfactant is a non-ionic surfactant.

Aspect 12. The drilling fluid of aspect 11, wherein the non-ionic surfactant is present in a range of from 1% to 20% by weight of the lubricant composition.

Aspect 13. The drilling fluid of aspect 10, wherein the surfactant comprises an ethoxylated mercaptan.

Aspect 14. The drilling fluid of aspect 13, wherein the ethoxylated mercaptan is present in a range of from 1% to 20% by weight of the lubricant composition.

Aspect 15. The drilling fluid of aspect 14, wherein the ethoxylated mercaptan is present in a range of from 7% to 12% by weight of the lubricant composition.

Aspect 16. The drilling fluid of aspect 14, wherein the ethoxylated mercaptan is present in an amount of 3% by weight of the lubricant composition.

Aspect 17. The drilling fluid of any of aspects 1 to 16, wherein the lubricant composition is present in a range of more than 0.1% by weight of the drilling fluid.

Aspect 18. The drilling fluid of aspect 17, wherein the lubricant composition is present in a range of more than 1.0% by weight of the drilling fluid.

Aspect 19. The drilling fluid of aspects 17 or 18, wherein the lubricant composition is present in a range of less than 5.0% by weight of the drilling fluid.

Aspect 20. The drilling fluid of any of aspects 17 to 19, wherein the lubricant composition is present in a range of less than 3.0% by weight of the drilling fluid.

Aspect 21. The drilling fluid of any of aspects 17 to 19, wherein the lubricant composition is present in an amount of 2.0% by weight of the drilling fluid.

Aspect 22. The drilling fluid of any of aspects 1 to 21, wherein the carrier is a water-based carrier, and wherein the lubricant composition is present in a range of from 1.0% to 5.0% by weight of the drilling fluid.

Aspect 23. The drilling fluid of any of aspects 1 to 21, wherein the carrier is an oil-based carrier, and wherein the lubricant composition is present in a range of from 1.0% to 5.0% by weight of the drilling fluid.

Aspect 24. The drilling fluid of any of aspects 1 to 23, wherein the lubricant composition further comprises an asphalt sulfonate salt.

Aspect 25. The drilling fluid of aspect 24, wherein the asphalt sulfonate salt is sodium asphalt sulfonate.

Aspect 26. The drilling fluid of aspects 24 or 25, wherein the asphalt sulfonate salt is present in a concentration of 15% to 30% by weight of the lubricant composition.

Aspect 27. The drilling fluid of any of aspects 1 to 26, wherein the coefficient of friction of the drilling fluid is 0.60 or lower.

Aspect 28. The drilling fluid of any of aspects 1 to 26, wherein the coefficient of friction of the drilling fluid is 0.20 or lower.

Aspect 29. The drilling fluid of any of aspects 1 to 28, wherein the coefficient of friction of the drilling fluid is less than 50% of the coefficient of friction of a similar drilling fluid without the lubricant composition.

Aspect 30. The drilling fluid of any of aspects 1 to 26, wherein the coefficient of friction of the drilling fluid is in a range of from 0.01 to 0.20 at a pressure of 100 pounds per square inch.

Aspect 31. The drilling fluid of any of aspects 1 to 26, wherein the coefficient of friction of the drilling fluid is in a range of from 0.10 to 0.60 at a pressure of 600 pounds per square inch.

Aspect 32. The drilling fluid of any of aspects 1 to 26, wherein the lubricant composition comprises the surfactant, and wherein the coefficient of friction of the drilling fluid is in a range of from 0.01 to 0.10 at a pressure of 100 pounds per square inch.

Aspect 33. The drilling fluid of any of aspects 1 to 26, wherein the lubricant composition comprises the surfactant, and wherein the coefficient of friction of the drilling fluid is in a range of from 0.40 to 0.60 at a pressure of 600 pounds per square inch.

Aspect 34. The drilling fluid of any of aspects 1 to 26, wherein the lubricant composition comprises the asphalt sulfonate salt, and wherein the coefficient of friction of the drilling fluid is in a range of from 0.01 to 0.10 at a pressure of 100 pounds per square inch.

Aspect 35. The drilling fluid of any of aspects 1 to 26, wherein the lubricant composition comprises the asphalt sulfonate salt, and wherein the coefficient of friction of the drilling fluid is in a range of from 0.10 to 0.50 at a pressure of 600 pounds per square inch.

Aspect 36. The drilling fluid of any of aspects 1 to 35, wherein the drilling fluid does not exhibit saponification in a Bakken brine or in a calcium chloride-based brine.

Aspect 37. The drilling fluid of aspect 36, wherein the drilling fluid has a pH of 11.0 or lower.

Aspect 38. A lubricant composition for a drilling fluid, the lubricant composition comprising:
an ethylene bottoms heavy pyrolysis oil; and
one or both of an asphalt sulfonate salt or a surfactant.

Aspect 39. The lubricant composition of aspect 38, wherein the lubricant composition comprises the asphalt sulfonate salt.

Aspect 40. The lubricant composition of aspect 38 or 39, wherein the lubricant composition comprises the surfactant.

Aspect 41. The lubricant composition of any of aspects 38 to 40, wherein the lubricant composition comprises the asphalt sulfonate salt and the surfactant.

Aspect 42. The lubricant composition of any of aspects 38 to 41, wherein the surfactant is a non-ionic surfactant.

Aspect 43. The lubricant composition of aspect 42, wherein the non-ionic surfactant is present in a range of from 1% to 20% by weight of the lubricant composition.

Aspect 44. The lubricant composition of any of aspects 38 to 43, wherein the surfactant comprises an ethoxylated mercaptan.

Aspect 45. The lubricant composition of aspect 44, wherein the ethoxylated mercaptan is present in a range of from 1% to 20% by weight of the lubricant composition.

Aspect 46. The lubricant composition of aspect 44, wherein the ethoxylated mercaptan is present in an amount of 3% by weight of the lubricant composition.

Aspect 47. The lubricant composition of any of aspects 38 to 46, wherein the asphalt sulfonate salt is sodium asphalt sulfonate.

Aspect 48. The lubricant composition of any of aspects 38 to 47, wherein the asphalt sulfonate salt is present in a concentration of from 15% to 30% by weight of the lubricant composition.

Aspect 49. The lubricant composition of any of aspects 38 to 48, wherein the heavy pyrolysis oil comprises bottoms from a hydrocarbon feedstock steam cracker furnace.

Aspect 50. The lubricant composition of any of aspects 38 to 49, wherein the heavy pyrolysis oil consists essentially of bottoms from a hydrocarbon feedstock steam cracker furnace.

Aspect 51. The lubricant composition of aspects 49 or 50, wherein the hydrocarbon feedstock comprises one or more of ethane, propane, butane, Liquefied Petroleum Gas (LPG), Natural Gas Liquids (NGL), light ($C_2$-$C_5$) hydrocarbons, or naphtha ($C_6$-$C_{10}$).

Aspect 52. The lubricant composition of any of aspects 38 to 51, wherein the heavy pyrolysis oil comprises from 75% to 80% by weight of petroleum hydrocarbons.

Aspect 53. The lubricant composition of aspect 52, wherein the heavy pyrolysis oil comprises about 78.1% by weight of petroleum hydrocarbons.

Aspect 54. The lubricant composition of any of aspects 38 to 53, wherein the heavy pyrolysis oil comprises:
naphthalene in a range of from 10% to 30% by weight,
biphenyl in a range of from 1% to 10% by weight,
phenanthrene in a range of from 1% to 10% by weight, and
anthracene in a range of from 1% to 10% by weight.

Aspect 55. The lubricant composition of any of aspects 38 to 53, wherein the heavy pyrolysis oil comprises:
less than 1000 ppm of $C_1$ to $C_6$ organic compounds,
less than 1000 ppm of $C_7$ to $C_8$ organic compounds,
about 500 ppm of $C_9$ to $C_{10}$ organic compounds,
from about 15,000 ppm to about 35,000 ppm of $C_{11}$ to $C_{12}$ organic compounds,
from about 250,000 ppm to about 450,000 ppm of $C_{13}$ to $C_{16}$ organic compounds,
from 150,000 ppm to about 350,000 ppm of $C_{17}$ to $C_{21}$ organic compounds,
from about 50,000 ppm to about 150,000 ppm of $C_{22}$ to $C_{35}$ organic compounds, and
from about 20,000 ppm to about 70,000 ppm of $C_n$ organic compounds, wherein $n>35$.

Aspect 56. The lubricant composition of aspect 55, wherein the heavy pyrolysis oil comprises:
less than 1000 ppm of $C_1$ to $C_6$ organic compounds,
less than 1000 ppm of $C_7$ to $C_8$ organic compounds,
about 500 ppm of $C_9$ to $C_{10}$ organic compounds,
about 25,000 ppm of $C_{11}$ to $C_{12}$ organic compounds,
about 361,000 ppm of $C_{13}$ to $C_{16}$ organic compounds,
about 232,000 ppm of $C_{17}$ to $C_{21}$ organic compounds,
about 111,000 ppm of $C_{22}$ to $C_{35}$ organic compounds, and
about 50,000 ppm of $C_n$ organic compounds, wherein $n>35$.

Aspect 57. The lubricant composition of any of aspects 38 to 56, wherein the lubricant composition does not induce saponification of a drilling fluid having a pH of 11.0 or lower.

Aspect 58. A method comprising preparing a drilling fluid by adding the lubricant composition of any of aspects 38 to 57 to a drilling fluid carrier.

Aspect 59. A composition comprising:
a carrier, and
a lubricant composition comprising:
an ethylene bottoms heavy pyrolysis oil; and
one or both of an asphalt sulfonate salt or a surfactant.

Aspect 60. A method comprising the step:
using the composition of aspect 59 as a lubricant for drilling fluids, coiled-tubing fluids or completion fluids,
wherein any of these fluids has brines or heavy brines selected from the group consisting of sea waters, brine, Bakken brines, and production water generated from oil-gas exploration.

Aspect 61. A method, comprising:
introducing a wellbore fluid comprising a lubricant composition comprising an ethylene bottoms heavy pyrolysis oil and one or both of an asphalt sulfonate salt and/or a surfactant into a subterranean formation zone.

Aspect 62. The method of aspect 61, wherein the lubricant composition is introduced into the subterranean formation zone as a component of a wellbore fluid comprising the lubricant composition and a carrier.

Aspect 63. The method of aspect 61 or 62, wherein the carrier is selected from the group consisting of brines, invert emulsions, and compositions thereof.

Aspect 64. A wellbore fluid, the wellbore fluid comprising:
a base fluid; and
a lubricant composition, the lubricant composition comprising:
an ethylene bottoms heavy pyrolysis oil; and
one or both of an asphalt sulfonate salt and a surfactant.

We claim:
1. A drilling fluid comprising:
a carrier selected from a water-based carrier and an oil-based carrier; and
a lubricant composition present in a range of from 0.1% to 5.0% by weight of the drilling fluid, wherein the lubricant composition comprises ethylene bottoms heavy pyrolysis oil comprising from 75% to 80% by weight of petroleum hydrocarbons.

2. The drilling fluid of claim 1, wherein the heavy pyrolysis oil comprises bottoms from a hydrocarbon feedstock steam cracker furnace comprising one or more of ethane, propane, butane, liquefied petroleum gas (LPG), natural gas liquids (NGL), light ($C_2$-$C_5$) hydrocarbons, or naphtha ($C_6$-$C_{10}$).

3. The drilling fluid of claim 1, wherein the heavy pyrolysis oil comprises:
   naphthalene in a range of from 10% to 30% by weight,
   biphenyl in a range of from 1% to 10% by weight,
   phenanthrene in a range of from 1% to 10% by weight, and
   anthracene in a range of from 1% to 10% by weight.

4. The drilling fluid of claim 1, wherein the heavy pyrolysis oil comprises:
   less than 1000 ppm of $C_1$ to $C_6$ organic compounds,
   less than 1000 ppm of $C_7$ to $C_8$ organic compounds,
   about 500 ppm of $C_9$ to $C_{10}$ organic compounds,
   from about 15,000 ppm to about 35,000 ppm of $C_{11}$ to $C_{12}$ organic compounds,
   from about 250,000 ppm to about 450,000 ppm of $C_{13}$ to $C_{16}$ organic compounds,
   from about 150,000 ppm to about 350,000 ppm of $C_{17}$ to $C_{21}$ organic compounds,
   from about 50,000 ppm to about 150,000 ppm of $C_{22}$ to $C_{35}$ organic compounds, and
   from about 20,000 ppm to about 70,000 ppm of $C_n$ organic compounds, wherein n>35.

5. The drilling fluid of claim 1, wherein the lubricant composition further comprises a non-ionic surfactant present in a range of from 1% to 20% by weight of the lubricant composition.

6. The drilling fluid of claim 5, wherein the surfactant comprises an ethoxylated mercaptan.

7. The drilling fluid of claim 1, wherein the lubricant composition is present in a range of more than 1.0% by weight and less than 5.0% by weight of the drilling fluid.

8. The drilling fluid of claim 1, wherein the lubricant composition further comprises an asphalt sulfonate salt in a concentration of from 15% to 30% by weight of the lubricant composition.

9. The drilling fluid of claim 1, wherein the coefficient of friction of the drilling fluid is 0.60 or lower.

10. The drilling fluid of claim 1, wherein the coefficient of friction of the drilling fluid is less than 50% of the coefficient of friction of a similar drilling fluid without the lubricant composition.

11. The drilling fluid of claim 1, wherein the coefficient of friction of the drilling fluid is in a range of from 0.01 to 0.20 at a pressure of 100 pounds per square inch.

12. The drilling fluid of claim 1, wherein the lubricant composition comprises a surfactant, and wherein the coefficient of friction of the drilling fluid is in a range of from 0.40 to 0.60 at a pressure of 600 pounds per square inch.

13. The drilling fluid of claim 1, wherein the lubricant composition comprises an asphalt sulfonate salt, and wherein the coefficient of friction of the drilling fluid is in a range of from 0.01 to 0.10 at a pressure of 100 pounds per square inch.

14. The drilling fluid of claim 1, wherein the drilling fluid does not exhibit saponification in a Bakken brine or in a calcium chloride-based brine.

15. The drilling fluid of claim 14, wherein the drilling fluid has a pH of 11.0 or lower.

16. A lubricant composition for a drilling fluid, the lubricant composition comprising:
   an ethylene bottoms heavy pyrolysis oil comprising from 75% to 80% by weight of petroleum hydrocarbons; and
   one or both of
   a) an asphalt sulfonate salt in a concentration of from 15% to 30% by weight of the lubricant composition; or
   b) a non-ionic surfactant present in a range of from 1% to 20% by weight of the lubricant composition.

17. The lubricant composition of claim 16, wherein the surfactant comprises an ethoxylated mercaptan.

18. The lubricant composition of claim 16, wherein the heavy pyrolysis oil consists essentially of bottoms from a hydrocarbon feedstock steam cracker furnace comprising one or more of ethane, propane, butane, liquefied petroleum gas (LPG), natural gas liquids (NGL), light ($C_2$-$C_5$) hydrocarbons, or naphtha ($C_6$-$C_{10}$).

19. The lubricant composition of claim 16, wherein the heavy pyrolysis oil comprises:
   naphthalene in a range of from 10% to 30% by weight,
   biphenyl in a range of from 1% to 10% by weight,
   phenanthrene in a range of from 1% to 10% by weight, and
   anthracene in a range of from 1% to 10% by weight.

20. The lubricant composition of claim 16, wherein the heavy pyrolysis oil comprises:
   less than 1000 ppm of $C_1$ to $C_6$ organic compounds,
   less than 1000 ppm of $C_7$ to $C_8$ organic compounds,
   about 500 ppm of $C_9$ to $C_{10}$ organic compounds,
   from about 15,000 ppm to about 35,000 ppm of $C_{11}$ to $C_{12}$ organic compounds,
   from about 250,000 ppm to about 450,000 ppm of $C_{13}$ to $C_{16}$ organic compounds,
   from 150,000 ppm to about 350,000 ppm of $C_{17}$ to $C_{21}$ organic compounds,
   from about 50,000 ppm to about 150,000 ppm of $C_{22}$ to $C_{35}$ organic compounds, and
   from about 20,000 ppm to about 70,000 ppm of $C_n$ organic compounds, wherein n>35.

* * * * *